US009793534B2

(12) United States Patent
Takahashi et al.

(10) Patent No.: US 9,793,534 B2
(45) Date of Patent: Oct. 17, 2017

(54) BATTERY PACK AND WIRING SUBSTRATE

(71) Applicant: SONY CORPORATION, Tokyo (JP)

(72) Inventors: Tsukasa Takahashi, Fukushima (JP); Tomomichi Okada, Fukushima (JP); Shoji Tatehata, Fukushima (JP)

(73) Assignee: SONY CORPORATION, Tokyo (JP)

( * ) Notice: Subject to any disclaimer, the term of this patent is extended or adjusted under 35 U.S.C. 154(b) by 757 days.

(21) Appl. No.: 14/275,200

(22) Filed: May 12, 2014

(65) Prior Publication Data
US 2014/0248530 A1  Sep. 4, 2014

Related U.S. Application Data

(63) Continuation of application No. 14/048,716, filed on Oct. 8, 2013, now Pat. No. 8,728,656, which is a
(Continued)

(30) Foreign Application Priority Data

Jan. 22, 2008 (JP) .................................. 2008-011959

(51) Int. Cl.
*H01M 2/34* (2006.01)
*H01M 2/06* (2006.01)
(Continued)

(52) U.S. Cl.
CPC ............ *H01M 2/342* (2013.01); *H01M 2/06* (2013.01); *H01M 2/1066* (2013.01); *H01M 2/22* (2013.01); *H01M 2/30* (2013.01)

(58) Field of Classification Search
CPC ................. H01M 2/021–2/0215; H01M 2/342
(Continued)

(56) References Cited

U.S. PATENT DOCUMENTS 5,220,520 A  6/1993 Kessoku
5,399,446 A  3/1995 Takahashi
(Continued)

FOREIGN PATENT DOCUMENTS

CN      1258233 C    5/2006
EP      1 403 942 A1  3/2004
(Continued)

OTHER PUBLICATIONS

Malaysian Office Action and Search Report issued on May 13, 2011, in corresponding Malaysian Application No. PI 20080918.
(Continued)

*Primary Examiner* — Jonathan G Leong
(74) *Attorney, Agent, or Firm* — Oblon, McClelland, Maier & Neustadt, L.L.P.

(57) ABSTRACT

A battery pack includes a pack body that includes a battery cell and that has an external shape substantially symmetric with respect to the horizontal and vertical axes, viewed from a front face on which terminals are arranged, and a terminal unit on the front face. The terminal unit includes a positive terminal, a negative terminal, a control terminal, and a temperature detection terminal for outputting temperature data. The positive terminal and the negative terminal are arranged on one side with respect to a center line in the width direction of the pack body. The control terminal is arranged symmetrically to the temperature detection terminal with respect to the center line in the width direction of the pack body.

19 Claims, 11 Drawing Sheets

Related U.S. Application Data continuation of application No. 12/057,433, filed on Mar. 28, 2008, now Pat. No. 8,691,411.

(51) Int. Cl.
    *H01M 2/10* (2006.01)
    *H01M 2/22* (2006.01)
    *H01M 2/30* (2006.01)

(58) Field of Classification Search
    USPC .................................. 429/92, 162, 178, 179
    See application file for complete search history.

(56) References Cited

U.S. PATENT DOCUMENTS

| | | | |
|---|---|---|---|
| 5,747,189 | A | 5/1998 | Perkins |
| 6,524,732 | B1 | 2/2003 | Iwaizono et al. |
| 6,861,821 | B2 | 3/2005 | Masumoto et al. |
| 7,262,956 | B2 | 8/2007 | Suzuki et al. |
| 2003/0180582 | A1 | 9/2003 | Masumoto et al. |
| 2005/0272479 | A1 | 12/2005 | Infanti |

FOREIGN PATENT DOCUMENTS

| | | |
|---|---|---|
| JP | 6-20665 | 1/1994 |
| JP | P2002-164028 A | 6/2002 |
| JP | 2005-166644 | 6/2005 |
| JP | 2006-59553 | 3/2006 |

OTHER PUBLICATIONS

Notification of the Second Chinese Office Action issued Nov. 27, 2013, in Chinese Patent Application No. 201110180181.7 with English translation.

The Second Chinese Office Action issued on Nov. 27, 2013, in Patent Application No. 201110180181.7 with English translation.

Chinese Search Report issued Nov. 19, 2013, in Patent Application No. 201110180181.7 with English translation.

Extended European Search Report issued Dec. 8, 2014 in Patent Application No. 08153765.6.

BATTERY PACK AND WIRING SUBSTRATE

CROSS REFERENCES TO RELATED APPLICATIONS

This application is a continuation of U.S. application Ser. No. 14/048,716, filed Oct. 8, 2013, which is a continuation of U.S. application Ser. No. 12/057,433, filed Mar. 28, 2008, now U.S. Pat. No. 8,691,411, and is based upon and claims the benefit of priority from prior Japanese Patent Application No. 2008-011959, filed Jan. 22, 2008. The entire contents of each of these documents are incorporated herein by reference.

BACKGROUND OF THE INVENTION

1. Field of the Invention

The present invention relates to a battery pack loaded in an electronic device, such as a digital still camera, a digital video camera, or a portable information processing apparatus, and to a wiring substrate used in the battery pack.

2. Description of the Related Art

Some of battery packs loaded in various electronic devices, such as digital still cameras, digital video cameras, and portable information processing apparatuses, have external shapes symmetric with respect to the horizontal and vertical axes and include battery cells (for example, refer to Japanese Unexamined Patent Application Publication No. 2005-166644). It can be difficult for battery packs having external shapes that are not symmetric with respect to the horizontal and vertical axes to be removed from battery mounting units if users load the battery packs inside out in the battery mounting units of the electronic devices whereas the battery packs having external shapes symmetric with respect to the horizontal and vertical axes can be easily removed from the battery mounting units even if users load the battery pack inside out in the battery mounting units of the electronic devices. However, the battery packs having external shapes symmetric with respect to the horizontal and vertical axes can be easily loaded in the battery mounting units as in the case where the battery packs are correctly loaded in the battery mounting units even when the users attempt to load the battery packs inside out in the battery mounting units of the electronic devices.

Some battery packs are provided with communication terminals, in addition to positive terminals and negative terminals. Such battery packs includes authentication chips for authentication between the battery packs and the electronic devices in which the battery packs are loaded and communicate with the electronic devices for the authentication through the communication terminals.

However, if the battery packs of the above type are loaded in the battery mounting units inside out, the positive terminals of the battery packs are possibly connected to the communication contacts of the battery mounting units, which should be electrically connected to the communication terminals of the battery packs, to apply abnormal voltage including battery voltage to the electronic devices, thus causing failure of the electronic devices. In addition, if the battery packs are loaded inside out in the battery mounting units of the electronic devices or in charging devices, for example, during the charging of the battery packs and the positive contacts of the battery mounting units or the charging devices are connected to the communication terminals of the battery packs to apply abnormal voltage including charge voltage to the electronic devices, the authentication chips possibly fail.

Furthermore, if conductive members are erroneously contact with parts between the positive terminals and control terminals of the battery packs, the devices connected to the control terminals possibly fail.

SUMMARY OF THE INVENTION

It is desirable to provide a battery pack and a wiring substrate capable of preventing failure of devices in a pack body having an external shape that is symmetric with respect to the horizontal and vertical axes and of an electronic device even if the pack body is erroneously loaded in the electronic device.

According to an embodiment of the present invention, a battery pack includes a pack body that includes a battery cell and that has an external shape substantially symmetric with respect to the horizontal and vertical axes, viewed from a front face on which terminals are arranged, and a terminal unit on the front face. The terminal unit includes a positive terminal, a negative terminal, a control terminal, and a temperature detection terminal for outputting temperature data. The positive terminal and the negative terminal are arranged on one side with respect to a center line in the width direction of the pack body. The control terminal is arranged symmetrically to the temperature detection terminal with respect to the center line in the width direction of the pack body.

According to another embodiment of the present invention, a battery pack includes a pack body that includes a battery cell and that has an external shape substantially symmetric with respect to the horizontal and vertical axes, viewed from a front face on which terminals are arranged, and a terminal unit that is provided on the front face and that is connected to an electrical contact part of a battery mounting unit when the battery pack is loaded in the battery mounting unit. The terminal unit includes a positive terminal, a negative terminal, a control terminal, and a temperature detection terminal for outputting temperature data. The positive terminal, the negative terminal, and one of the control terminal and the temperature detection terminal are arranged on one side with respect to a center line in the width direction of the pack body. The other of the control terminal and the temperature detection terminal is arranged on the other side with respect to the center line in the width direction of the pack body. The other of the control terminal and the temperature detection terminal is not arranged symmetrically to the positive terminal and the negative terminal with respect to the center line in the width direction of the pack body. The control terminal is arranged symmetrically to the temperature detection terminal with respect to the center line in the width direction of the pack body.

According to another embodiment of the present invention, a wiring substrate used in a battery pack that has an external shape substantially symmetric with respect to the horizontal and vertical axes, viewed from a front face on which terminals are arranged, and that has a terminal unit on the front face. The terminal unit is connected to an electrical contact part of a battery mounting unit when the battery pack is loaded in the battery mounting unit. The terminal unit includes a positive terminal, a negative terminal, a control terminal, and a temperature detection terminal for outputting temperature data. The positive terminal, the negative terminal, the control terminal, and the temperature detection terminal are arranged on a face that has a substantially rectangular shape and that faces outward when the wiring substrate is mounted to the front face of the battery pack. The positive terminal, the negative terminal, and one of the control terminal and the temperature detection terminal are arranged on one side with respect to a center line in the width direction of the pack body. The other of the control terminal and the temperature detection terminal is arranged on the other side with respect to the center line in the width direction of the pack body. The other of the control terminal and the temperature detection terminal is not arranged symmetrically to the positive terminal and the negative terminal with respect to the center line in the width direction of the pack body. The control terminal is arranged symmetrically to the temperature detection terminal with respect to the center line in the width direction of the pack body.

According to the present invention, the terminal arranged on the other side with reference to the center line in the width direction of the pack body is not arranged symmetrically to the positive terminal and the negative terminal with reference to the center line in the width direction of the pack body. In addition, the control terminal is arranged symmetrically to the temperature detection terminal with respect to the center line in the width direction of the pack body. Accordingly, even if the battery pack is erroneously loaded in the battery mounting unit of an electronic device, it is possible to prevent abnormal voltage from being applied to, for example, the electrical contact of the electronic device, to which the control terminal is electrically connected. During charging, it is possible to prevent abnormal voltage including charge voltage from being applied to the control terminal and the temperature detection terminal.

DESCRIPTION OF THE PREFERRED EMBODIMENTS

A battery pack according to an embodiment of the present invention will now be described with reference to the attached drawings.

Figure 1:
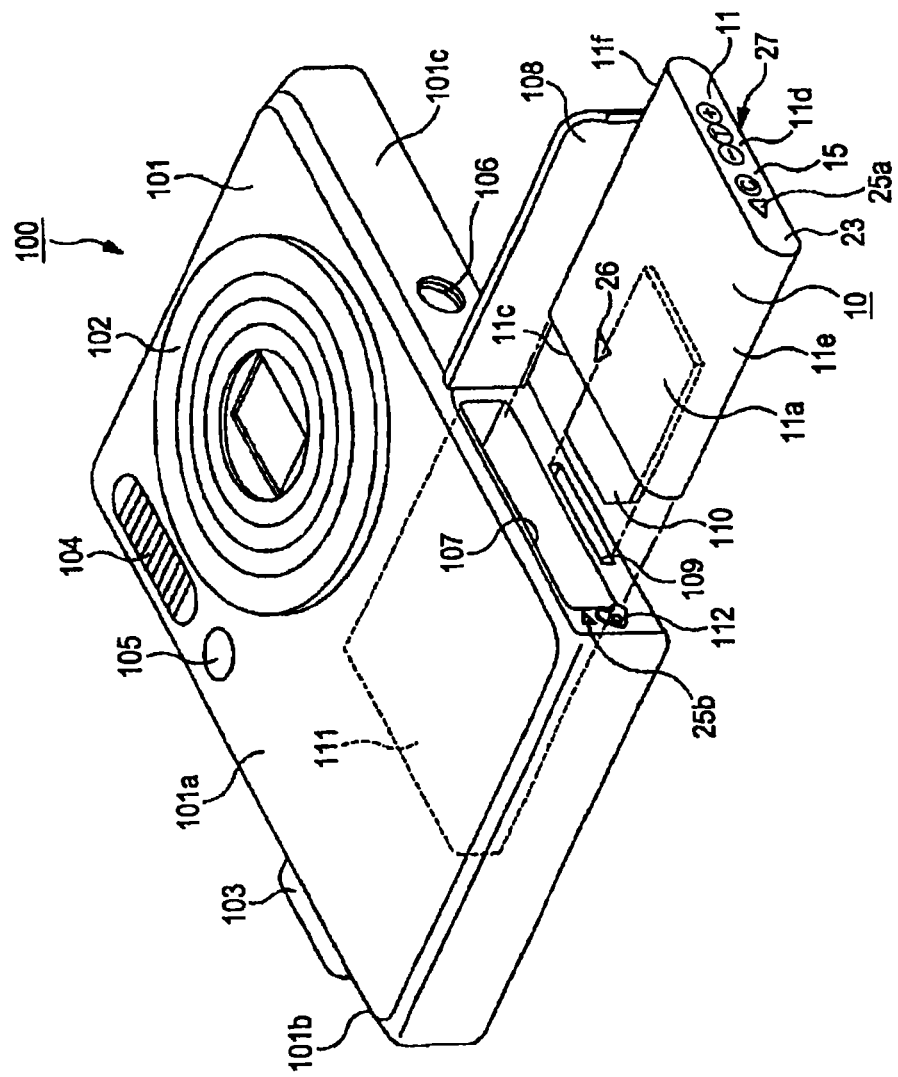
FIG. 1 is a perspective view of a battery pack according to an embodiment of the present invention when the battery pack is loaded in a digital still camera.

FIG. 1 is a perspective view of a battery pack 10 according to an embodiment of the present invention when the battery pack 10 is loaded in a digital still camera 100, which is an electronic device. The digital still camera 100 has a substantially rectangular thin camera body 101. A lens unit 102 including multiple lenses, such as a zoom lens and a condenser lens, is provided on a front face 101*a* of the camera body 101. A release button 103 is provided near one corner of a top face 101*b* of the camera body 101. The release button 103 is pressed in order to capture an image of a subject. A light emitting unit 104 emitting light in flash photography is provided toward the top face 101*b* on the front face 101*a* of the camera body 101. A finder window 105 is adjacent to the light emitting unit 104. A mounting unit 106 is provided at a substantially central position in the width direction on a bottom face 101*c* of the camera body 101. A tripod etc. is mounted to the mounting unit 106.

A substantially rectangular battery slot 107 is provided on the bottom face 101*c* of the camera body 101. The battery slot 107 has approximately the same size and shape as the front face of the battery pack 10 and the battery pack 10 is inserted into the battery slot 107. A battery cover 108 is provided to open and close the battery slot 107. A card slot 109 into which a memory card 110 is inserted is adjacent to the battery slot 107 in an area opened and closed by the battery cover 108. The memory card 110 is an external storage device. A battery mounting unit 111 is provided in the camera body 101 and the battery mounting unit ill is contiguous to the battery slot 107. A lock member 112 is provided near the battery slot 107. The lock member 112 holds the battery pack 10 loaded in the battery mounting unit 111 in its mounting position. When the battery pack 10 is loaded in the battery mounting unit 111, the lock member 112 engages with a corner on a rear face 11*d* of the battery pack 10, which is urged outward by spring pressures of electrical contacts or a spring, to prevent the battery pack 10 from dropping from the battery mounting unit 111. Specifically, the lock member 112 is rotatably mounted near the battery slot 107. One end of the lock member 112 faces the battery slot 107 and engages with the corner on the rear face 11*d* of the battery pack 10 loaded in the battery mounting unit 111 to hold the battery pack 10 in its mounting position.

In order to remove the battery pack 10 from the battery mounting unit 111, the lock member 112 is retracted from the battery slot 107 to disengage the corner on the rear face 11*d* of the battery pack 10 from the lock member 112. As a result, the battery pack 10 is pushed out of the battery slot 107 owing to the elastic force of the spring.

Figure 2:
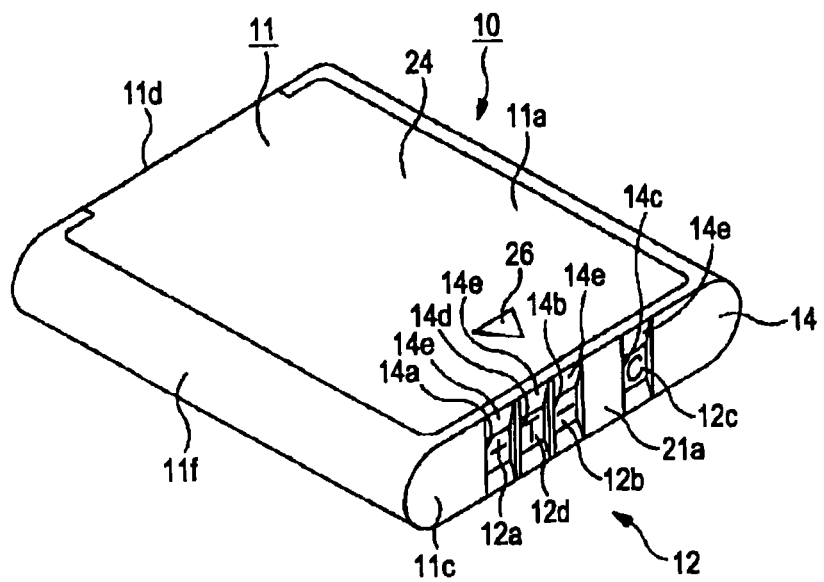
FIG. 2 is a perspective view of the battery pack according to the embodiment of the present invention, viewed from above and in front.
Figure 3:
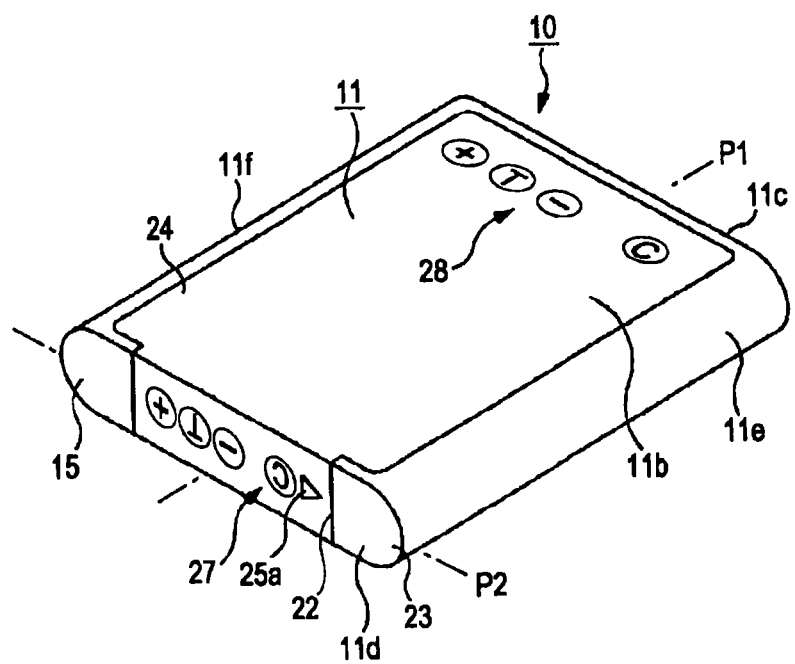
FIG. 3 is a perspective view of the battery pack according to the embodiment of the present invention, viewed from below.

The battery pack 10, which is loaded in the battery mounting unit 111 through the battery slot 107 to supply power to the camera body 101, includes, for example, a lithium ion polymer secondary battery. Specifically, as shown in FIGS. 2 and 3, the battery pack 10 has a pack body 11 including a battery cell 29, which is a lithium ion polymer secondary battery. The pack body 11 has a substantially rectangular plane shape. The pack body 11 has flat top face 11a, bottom face 11b, front face 11c, and rear face 11d and has circular side faces 11e and 11f raised outward. The pack body 11 has approximately the same thickness from the front face 11c to the rear face 11d. The pack body 11 is symmetric with respect to a center line P1 in the width direction of the pack body 11 and is also symmetric with respect to a center line P2 in the thickness direction of the pack body 11, as viewed from the front face 11c on which a terminal unit 12 is provided. The front face 11c of the pack body 11 is headed for the battery slot 107 of the digital still camera 100 and the terminal unit 12 is provided on the front face 11c. The terminal unit 12 is pressed into contact with an electrical contact part on the bottom face of the battery mounting unit 111 to be electrically connected to the digital still camera 100. Accordingly, the battery pack 10 can be easily removed from the battery mounting unit 111 even if the battery pack 10 is inserted into the battery slot 107 inside out.

According to the embodiment of the present invention, it is necessary for the pack body 11 to have approximately the same thickness from the front face 11c to the rear face 11d. In addition, it is necessary for the pack body 11 to be symmetric with respect to the center line P1 in the width direction and to also be symmetric with respect to the center line P2 in the thickness direction, as viewed from the front face 11c on which the terminal unit 12 is provided. However, any small recesses, protrusions, slots may be provided on the front face 11c and/or the rear face 11d for various purposes including prevention of incorrect insertion and determination of the type of the battery. The battery pack 10 has an external shape at least allowing the battery pack 10 to be loaded in the battery mounting unit 111 inside out and may have an external shape allowing the battery pack 10 to be loaded in the battery mounting unit 111 upside down.

Figure 4:
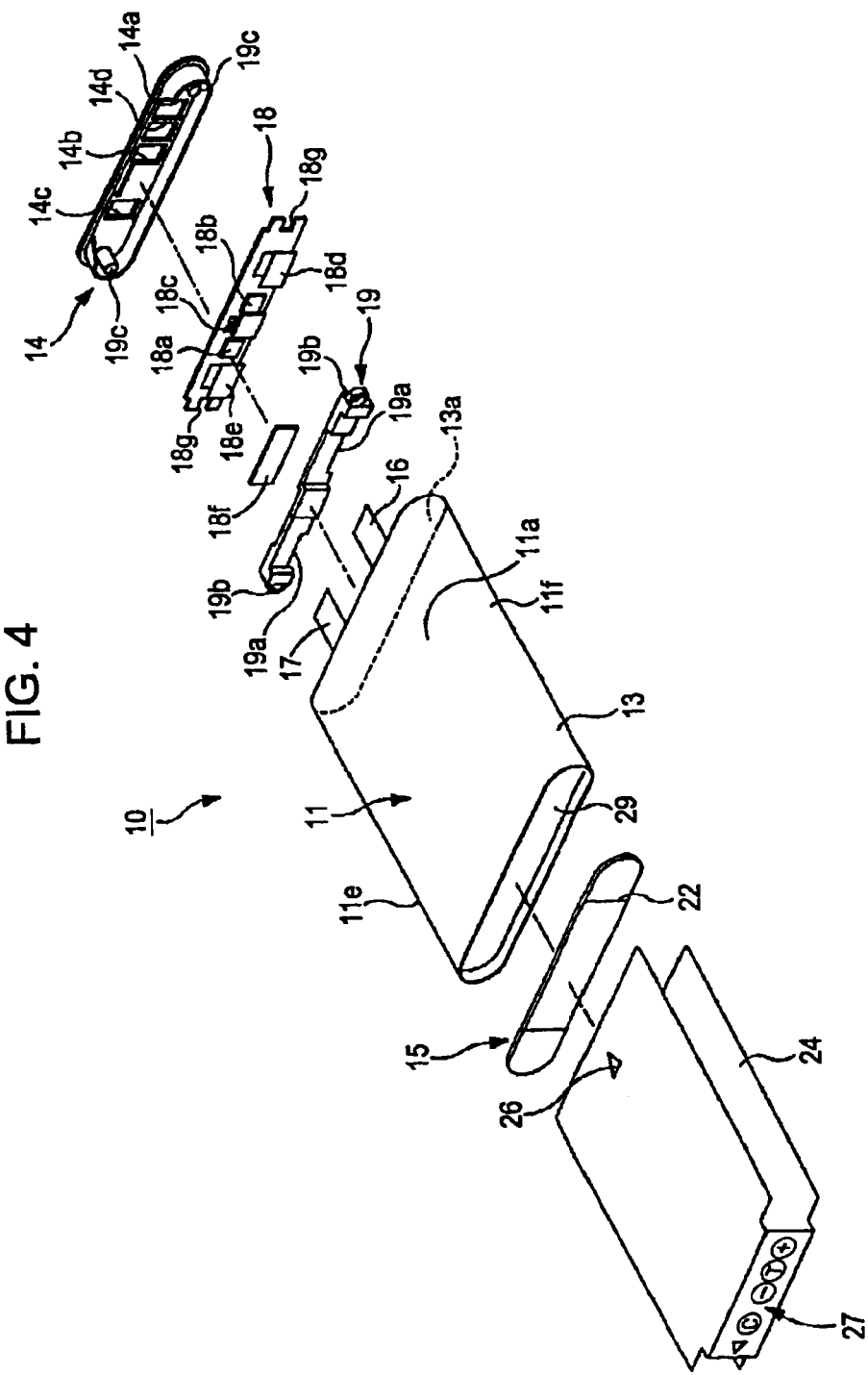
FIG. 4 is an exploded perspective view of the battery pack according to the embodiment of the present invention.

Specifically, as shown in FIG. 4, the pack body 11 has a substantially rectangular flat tube body 13. The tube body 13 is formed of, for example, a metallic material made of aluminum and a nylon plastic film provided on the surface of the metallic material. The nylon plastic film is provided for electrical insulation and protection of the surface of the tube body 13. The tube body 13 also has a polypropylene plastic film having superior insulation and flexibility inside the metallic material so that a front-side opening 13a and a rear-side opening 13b of the tube body 13 can be heat-sealed with a top cover 14 and a bottom cover 15, respectively, which closes the front-side opening 13a and the rear-side opening 13b. The tube body 13 has the battery cell 29, which is a lithium ion polymer secondary battery, loaded therein. A positive lead terminal 16 and a negative lead terminal 17 extend from the front-side opening 13a.

A holder 19 to which a wiring substrate 18 is mounted is fit into the front-side opening 13a from which the positive lead terminal 16 and the negative lead terminal 17 extend. The top cover 14 is mounted to the holder 19. The wiring substrate 18 is a rigid printed circuit board having approximately the same shape and size as the front-side opening 13a. Multiple electronic components are mounted on one face toward the holder 19 of the wiring substrate 18.

Specifically, a protection device 18a, an authentication device 18b, and a field effect transistor (FET) device 18c are mounted on the wiring substrate 18. A circuit for protecting the battery cell 29 is provided in the protection device 18a. A circuit for authentication between the battery pack 10 and the digital still camera 100 is provided in the authentication device 18b. The FET device 18c controls the charging. A positive tab 18d and a negative tab 18e are also mounted on the wiring substrate 18. The positive lead terminal 16 extending from the battery cell 29 is fixed to the positive tab 18d by a welding method, such as resistance welding. The negative lead terminal 17 extending from the battery cell 29 is fixed to the negative tab 18e through a positive temperature coefficient (PTC) device 18f by a welding method, such as the resistance welding. The PTC device 18f is provided to practically shut off the current flowing through the battery cell 29 when the temperature of the battery cell 29 becomes higher than a temperature that is set and the electrical resistance sharply increases.

The wiring substrate 18, on which the electronic components are mounted in the above manner, to which the positive lead terminal 16 is fixed, and to which the negative lead terminal 17 is fixed through the PTC device 18f, is positioned and mounted on one face of the holder 19, that is, the face opposite to the battery cell 29. The holder 19 is fit into the front-side opening 13a of the tube body 13. Cutouts 19a are provided on one longer and narrower side of the holder 19. The cutouts 19a are provided to cause the positive lead terminal 16 and the negative lead terminal 17 to wrap around the holder 19 toward the face on which the wiring substrate 18 is mounted. The holder 19 is made of, for example, a polypropylene plastic material. The holder 19 to which the top cover 14 is mounted is fit into the front-side opening 13a of the tube body 13 and is heat-sealed with the top cover 14.

Figure 5A:
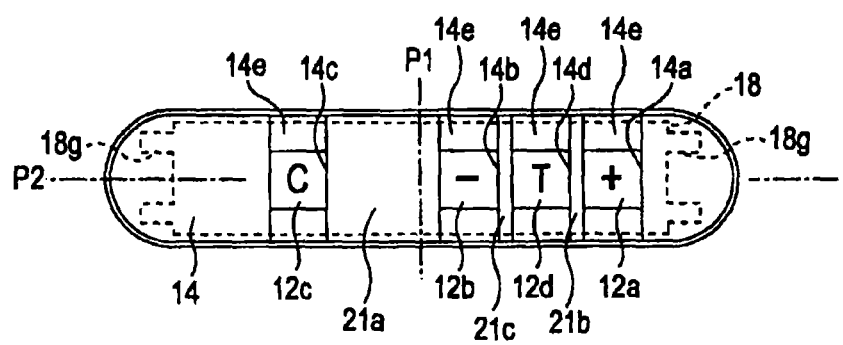
FIG. 5A is a front view of the battery pack according to the embodiment of the present invention and FIG. 5B is a plan view of a wiring substrate according to an embodiment of the present invention.
Figure 5B:
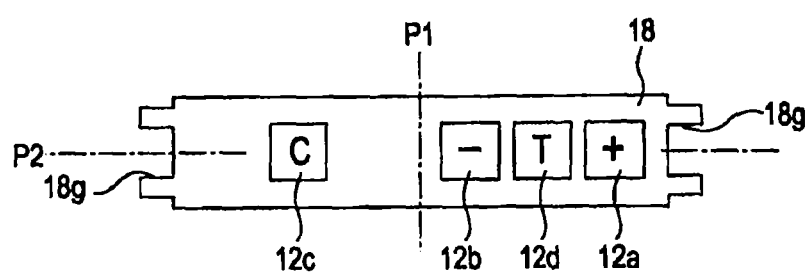

FIG. 5A is a front view of the battery pack 10 according to the embodiment of the present invention and FIG. 5B is a plan view of the wiring substrate 18. As shown in FIGS. 5A and 5B, a positive terminal 12a, a negative terminal 12b, a control terminal 12c, and a temperature detection terminal 12d, which form the terminal unit 12, are provided on the other face of the wiring substrate 18, that is, on the face toward the top cover 14. Specifically, the four terminals 12a to 12d are arranged in a line on the center line P2 in the thickness direction. The positive terminal 12a, the temperature detection terminal 12d, and the negative terminal 12b are arranged at equal intervals from the end to the center on one side with respect to the center line P1 in the width direction and the control terminal 12c is arranged on the other side with respect to the center line P1 in the width direction. The control terminal 12c is not arranged symmetrically to the positive terminal 12a and the negative terminal 12b with respect to the center line P1 in the width direction. The temperature detection terminal 12d is arranged symmetrically to the control terminal 12c with respect to the center line P1 in the width direction. Since the negative terminal 12b is arranged at the innermost part and the positive terminal 12a is arranged at the outer part with the temperature detection terminal 12d sandwiched between the negative terminal 12b and the positive terminal 12a, the control terminal 12c is most far from the positive terminal 12a to prevent the positive terminal 12a from being electrically connected to the control terminal 12c erroneously.

According to the embodiment of the present invention, the position of the temperature detection terminal 12d is interchangeable with that of the control terminal 12c.

The top cover 14 is mounted on the other face of the wiring substrate 18 on which the terminals 12a to 12d are provided, as shown in FIG. 4 and FIGS. 5A and 5B. The top cover 14 is fit into the front-side opening 13a of the tube body 13 to close the front-side opening 13a. The top cover 14 composes the front face 11c of the pack body 11. The top cover 14 is made of, for example, a polypropylene plastic material and is heat-sealed with the front-side opening 13a of the tube body 13 after being fit into the front-side opening 13a.

Figure 6:
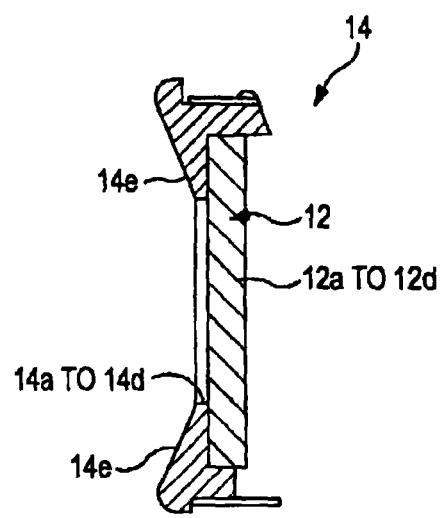
FIG. 6 is a cross sectional view of a terminal unit.

As shown in FIG. 2 and FIGS. 4 to 6, the top cover 14 has terminal openings 14a to 14d through which the positive terminal 12a, the negative terminal 12b, the control terminal 12c, and the temperature detection terminal 12d are exposed to outside, respectively. Specifically, the positive terminal 12a is exposed to outside through the terminal opening 14a, the negative terminal 12b is exposed to outside through the terminal opening 14b, the control terminal 12c is exposed to outside through the terminal opening 14c, and the temperature detection terminal 12d is exposed to outside through the terminal opening 14d. The terminal openings 14a to 14d each have a substantially rectangular shape. In addition, as shown in FIG. 6, the terminal openings 14a to 14d each have upper and lower taper portions 14e tilting down toward the insides thereof. The taper portions 14e are provided to allow the electrical contacts provided on the bottom face of the battery mounting unit 111 of the digital still camera 100 to easily approach the terminal openings 14a to 14d and to be easily pressed into contact with the terminals 12a to 12d.

As shown in FIG. 5, a space 21a between the terminal opening 14b for the negative terminal 12b and the terminal opening 14c for the control terminal 12c is made wider than a space 21b between the terminal opening 14a for the positive terminal 12a and the terminal opening 14d for the temperature detection terminal 12d and a space 21c between the terminal opening 14d for the temperature detection terminal 12d and the terminal opening 14b for the negative terminal 12b. The space 21a serves as a contact portion with which the spring is contact when the battery pack 10 is loaded in the battery mounting unit 111 of the digital still camera 100.

The rear-side opening 13b of the tube body 13 is closed with the bottom cover 15, as shown in FIGS. 3 and 4. The bottom cover 15 is made of, for example, a polypropylene plastic material and is heat-sealed with the rear-side opening 13b of the tube body 13 after being fit into the rear-side opening 13b. A label recess portion 22 is provided in the central area in the width direction of the bottom cover 15. One end of the bottom cover 15 serves as an engaged portion 23 with which the lock member 112 is engaged when the battery pack 10 is loaded in the battery mounting unit 111 of the digital still camera 100.

After the top cover 14 and the bottom cover 15 are mounted to the tube body 13, a label 24 is pasted across the top face 11a, the rear face 11d, and the bottom face 11b of the pack body 11, as shown in FIGS. 2 to 4. The label 24 is formed of, for example, a polyethylene terephthalate plastic sheet and an adhesive film under the plastic sheet. The face opposite to the adhesive film serves as a printing face. Of the label 24, the portion corresponding to the rear face 11d of the pack body 11 is made narrower to have approximately the same width as the label recess portion 22. The label 24 pasted across the top face 11a, the rear face 11d, and the bottom face 11b of the pack body 11 presses the bottom cover 15 heat-sealed with the tube body 13 toward the tube body 13 to prevent the bottom cover 15 from dropping from the tube body 13.

Since the portion where the label 24 is pasted on the rear face 11d of the pack body 11 is not raised from the surrounding portions, the length of the battery pack 10 is not increased to contribute the reduction in size of the battery pack 10. In addition, it is possible to prevent the label 24 from being scratched and/or curled when the battery pack 10 is loaded in or removed from the battery mounting unit ill or a charging device. The provision of the label recess portion 22 on the rear face 11d of the pack body 11 causes the portion where the label 24 is pasted to be substantially even with the surrounding portions to improve the touch.

Since the width of the label 24, corresponding to the rear face 11d of the pack body 11, is made narrower to increase the areas of both sides of the label 24, the engaged portion 23 with which the lock member 112 is engaged when the battery pack 10 is loaded in the battery mounting unit 111 can be sufficiently increased in size.

Printing on the label 24 will now be described with reference to FIGS. 2 and 3. An orientation indicator 25a denoted by Δ is provided on the rear face 11d of the pack body 11. The orientation indicator 25a indicates the orientation in which the battery pack 10 is inserted into the battery slot 107 of the digital still camera 100. As shown in FIG. 1, the orientation indicator 25a can be aligned with an orientation indicator 25b that is denoted by Δ and that is provided near the battery slot 107 of the digital still camera 100 to insert the battery pack 10 into the battery slot 107 in the correct orientation (not inside out).

An insertion direction indicator 26 denoted by Δ is provided on the top face 11a of the pack body 11. The insertion direction indicator 26 indicates the direction in which the battery pack 10 is inserted into the battery slot 107 of the digital still camera 100. A user can refer to the insertion direction indicator 26 to head the front face 11c, on which the terminal unit 12 is provided, for the battery slot 107 to insert the battery pack 10 into the battery slot 107 in the correct direction. The insertion direction indicator 26 is provided toward the front face 11c on the top face 11a to visually indicate the front face 11c to be headed for the battery slot 107.

A function indicating unit 27 is provided on the rear face 11d of the pack body 11. The functions corresponding to the terminals in the terminal unit 12 are displayed in the function indicating unit 27. Specifically, a + sign, a T letter, a − sign, and a C letter indicating the functions of the positive terminal 12a, the temperature detection terminal 12d, the negative terminal 12b, and the control terminal 12c, respectively, are provided in the function indicating unit 27. The interval between the − sign and the C letter is made wider than the other intervals among the signs. The function indicating unit 27 allows the user to confirm the functions of the terminals.

The provision of the orientation indicator 25a and the function indicating unit 27 on the rear face 11d of the pack body 11, which is most visible to the user when the battery pack 10 is inserted into the battery slot 107, can prevent incorrect insertion to improve the operability.

A function indicating unit 28 is provided toward the front face 11c on the bottom face 11b of the pack body 11. The functions corresponding to the terminals in the terminal unit 12 are displayed in the function indicating unit 28. Specifically, a + sign, a T letter, a − sign, and a C letter indicating the functions of the positive terminal 12a, the temperature detection terminal 12d, the negative terminal 12b, and the control terminal 12c, respectively, are provided in the function indicating unit 28. The interval between the − sign and the C letter is made wider than the other intervals among the signs. The function indicating unit 28 allows the user to confirm the functions of the terminals.

The signs or symbols indicated in the orientation indicator 25a, the orientation indicator 25b, the insertion direction indicator 26, the function indicating unit 27, and the function indicating unit 28 are not restricted to the ones, such as the Δ symbol and the + sign.

Figure 7:
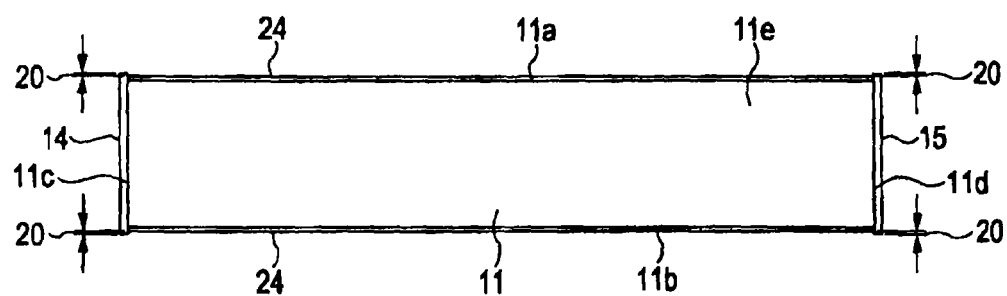
FIG. 7 is a side view of the battery pack according to the embodiment of the present invention.

The top cover 14 is made slightly larger than the front face 11c by an amount denoted by reference numeral 20 in FIG. 7 so that the top cover 14 slightly protrudes from the front face 11c of the pack body 11 after the label 24 is pasted. Similarly, the bottom cover 15 is made slightly larger than the rear face 11d by the amount denoted by reference numeral 20 in FIG. 7 so that the bottom cover 15 slightly protrudes from the rear face 11d of the pack body 11 after the label 24 is pasted. This can prevent the printing face of the label 24 from scraping against, for example, the inner face of the pack body 11 to make the label 24 invisible or to turn the label 24 when the battery pack 10 is loaded in or removed from the battery mounting unit 111.

Figure 8:
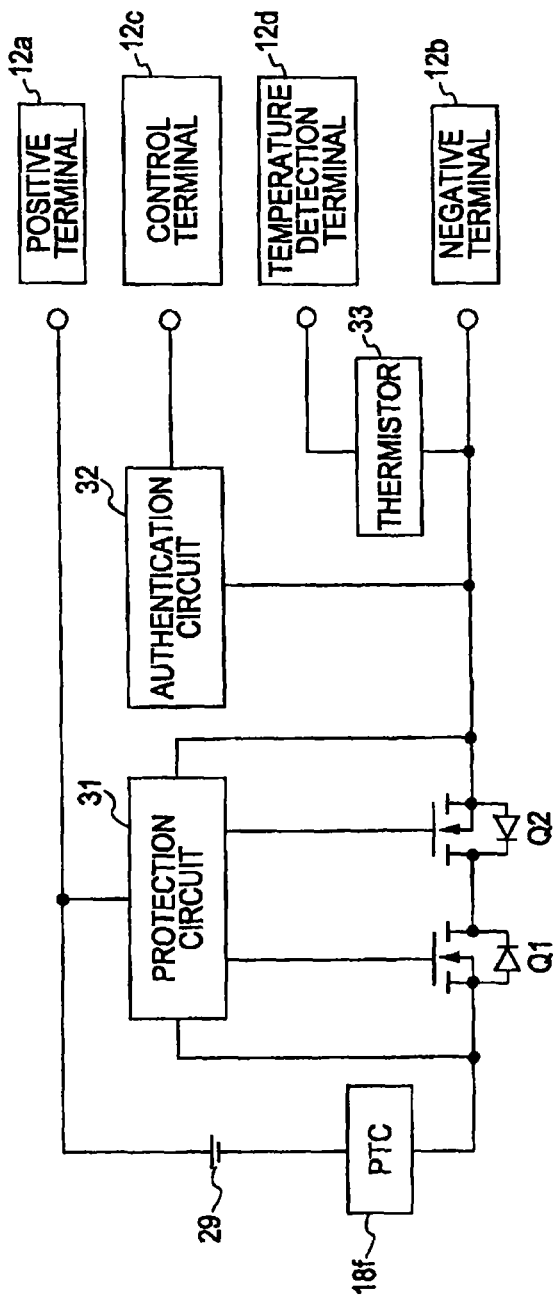
FIG. 8 is an exemplary circuit diagram of the battery pack according to the embodiment of the present invention.

FIG. 8 is an exemplary circuit diagram of the battery pack 10 configured in the above manner. In the battery pack 10 shown in FIG. 8, the positive lead terminal 16 of the battery cell 29 is connected in series to the positive terminal 12a of the wiring substrate 18. The negative lead terminal 17 of the battery cell 29 is connected in series to the negative terminal 12b of the wiring substrate 18 through the PTC device 18f. FETs Q1 and Q2 composed of the FET device 18c are connected between the PTC device 18f and the negative terminal 12b of the wiring substrate 18.

A positive power terminal of a protection circuit 31 composed of the protection device 18a mounted on the wiring substrate 18 is connected between the positive terminal 12a and the positive lead terminal 16 of the battery cell 29. Negative power terminals of the protection circuit 31 are connected between the PTC device 18f and the FET Q1 and between the negative terminal 12b and the FET Q2. Control terminals of the protection circuit 31 are connected to the gates of the FETs Q1 and Q2. The protection circuit 31 monitors the voltages among the terminals and turns off the FET Q1 and/or Q2 in case of overcharge or overdischarge to inhibit the charging.

A control terminal of an authentication circuit 32 composed of the authentication device 18b mounted on the wiring substrate 18 is connected to the control terminal 12c of the wiring substrate 18 and a negative power terminal of the authentication circuit 32 is connected to the negative terminal 12b of the wiring substrate 18. A thermistor 33, which is a temperature detection device, is connected between the temperature detection terminal 12d and the negative terminal 12b of the wiring substrate 18 to supply a temperature signal to the charging device through the temperature detection terminal 12d.

Since the authentication circuit 32 is driven in response to a signal supplied from the digital still camera 100 in the circuit shown in FIG. 8, it is possible to prevent the power of the battery cell 29 from being consumed due to a standby power generated when the battery pack 10 is not in use. In addition, since the temperature is detected by the thermistor 33 separated from the protection device 18a composing the protection circuit 31 in the circuit shown in FIG. 8, it is possible to reduce the cost of the protection device 18a.

Figure 9:
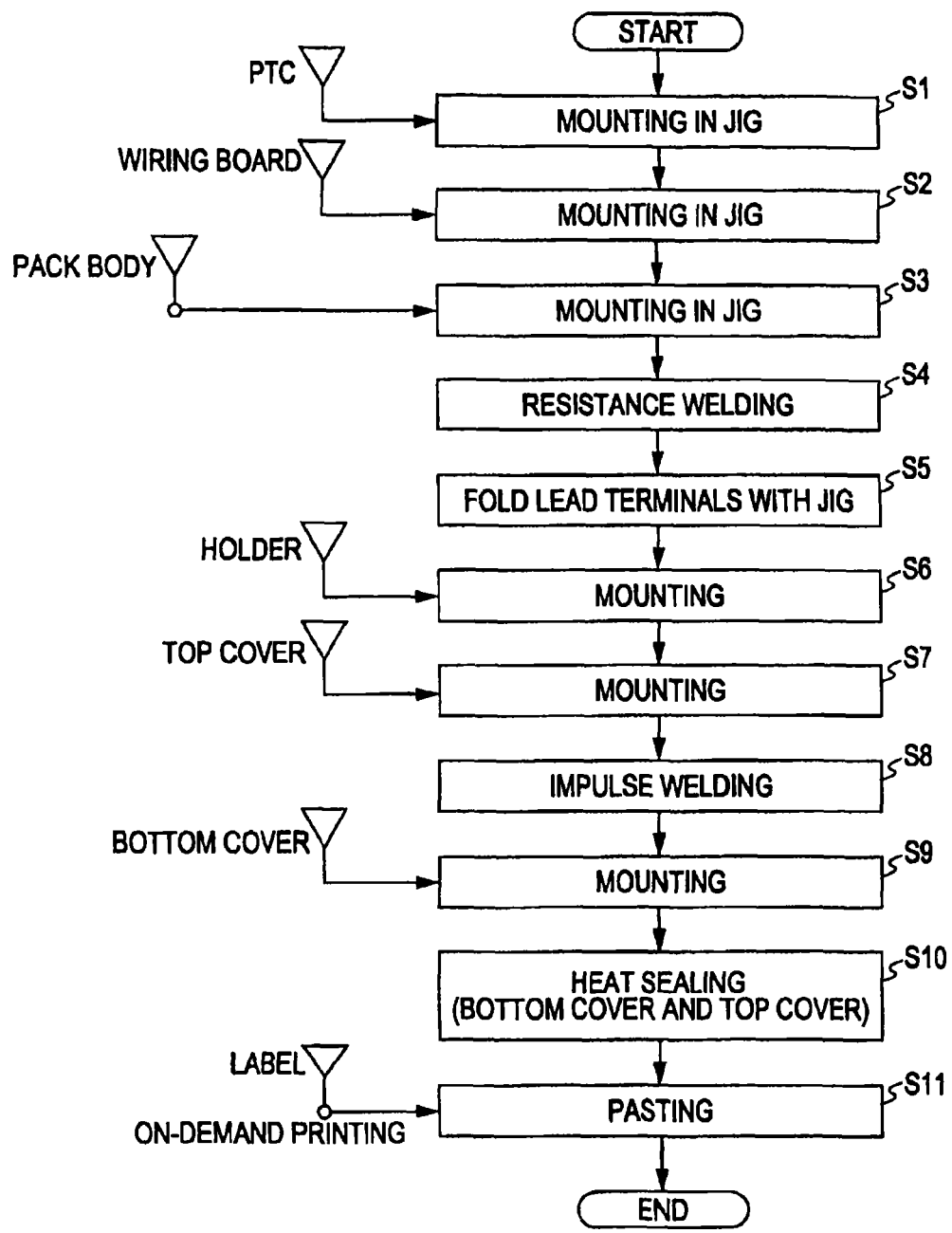
FIG. 9 is a flowchart showing an example of an assembly process of the battery pack according to the embodiment of the present invention.

FIG. 9 is a flowchart showing an example of an assembly process of the battery pack 10 configured in the above manner. Referring to FIG. 9, in Step S1, the PTC device 18f is mounted in a jig. In Step S2, the wiring substrate 18 on which the electronic components including the protection device 18a, the authentication device 18b, the FET device 18c, and the thermistor 33 are mounted is mounted in a jig. In Step S3, the pack body 11 is mounted in a jig. The pack body 11 is composed of the tube body 13 in which the battery cell 29 is loaded and the positive lead terminal 16 and the negative lead terminal 17 of which are cut into a predetermined length. In Step S4, the positive lead terminal 16 extending from the battery cell 29 is connected to the positive tab 18d of the wiring substrate 18 by the resistance welding and the negative lead terminal 17 extending from the battery cell 29 is connected to the negative tab 18e of the wiring substrate 18 through the PTC device 18f by the resistance welding. In Step S5, the positive lead terminal 16 and the negative lead terminal 17 subjected to the resistance welding are folded in a predetermined shape.

In Step S6, the wiring substrate 18 is mounted to the holder 19. In Step S7, the holder 19 is mounted to the top cover 14. In Step S8, the holder 19 is welded to the top cover 14 by impulse welding and the holder 19 welded to the top cover 14 is fit into the front-side opening 13a of the tube body 13. As shown in FIG. 4, the top cover 14 is mounted to the holder 19 by fitting projections 19c on both sides of the rear face of the top cover 14 into through-holes 19b on both sides of the holder 19 and welding the projections 19c to the holder 19 by the impulse welding. Recesses 18g on both sides of the wiring substrate 18 are engages with the projections 19c on the rear face of the top cover 14 between the top cover 14 and the holder 19 to position the top cover 14 and the holder 19. In Step S9, the bottom cover 15 is fit into the rear-side opening 13b of the tube body 13. In Step S10, the top cover 14 and the bottom cover 15 are heat-sealed with the tube body 13.

In Step S11, the label 24 produced by on-demand printing is supplied and is pasted across the top face 11a, the rear face 11d, and the bottom face 11b of the pack body 11, the front-side opening 13a and the rear-side opening 13b of which are closed with the top cover 14 and the bottom cover 15, respectively.

A method of mounting the battery pack 10 assembled in the above manner in the battery mounting unit 111 of the digital still camera 100 will now be described with reference to FIGS. 1, 10, and 11A to 11C. As shown in FIG. 1 and FIG. 11A, the battery pack 10 is inserted into the battery slot 107 in the direction indicated by the insertion direction indicator 26 on the top face 11a of the pack body 11, with the Δ symbol of the orientation indicator 25a on the rear face 11d of the pack body 11 aligned with the orientation indicator 25b near the battery slot 107, to mount the battery pack 10 in the battery mounting unit 111.

The pack body 11 of the battery pack 10 is symmetric with respect to the center line P1 in the width direction and is also symmetric with respect to the center line P2 in the thickness direction. The battery slot 107 and the battery mounting unit 111 are provided in accordance with the symmetry of the battery pack 10. For example, if the pack body 11 is inserted into the battery slot 107 inside out without following the indication of the orientation indicator 25a, the pack body 11 is loaded in the battery mounting unit 111 inside out. Accordingly, the orientation indicator 25a is provided on the rear face 11d, which is most visible to the user when the battery pack 10 is inserted into the battery slot 107, and the insertion direction indicator 26 is provided on the top face 11a, which is highly visible, to prevent incorrect insertion.

Figure 10:
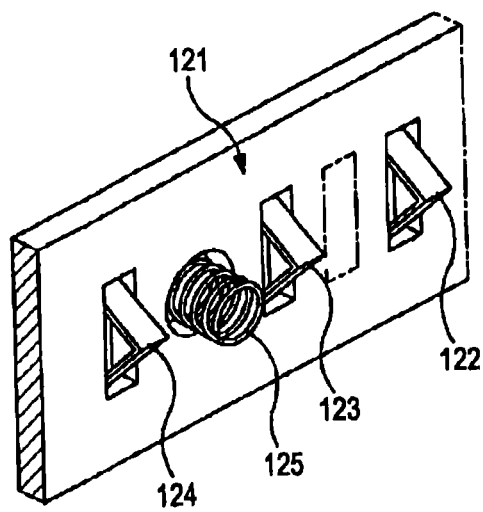
FIG. 10 is a perspective view of an electrical contact part of a battery mounting unit in which the battery pack according to the embodiment of the present invention is loaded.
Figure 11A:
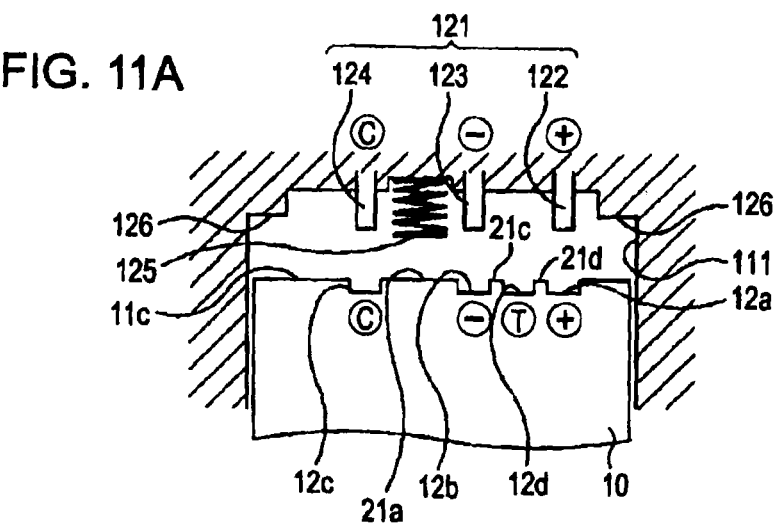
FIG. 11A is a cross sectional view showing a state in which the battery pack according to the embodiment of the present invention is being loaded in the battery mounting unit of the digital still camera.

FIG. 10 is a perspective view of an electrical contact part 121 of the battery mounting unit 111 in which the battery pack 10 is mounted. The electrical contact part 121 is provided on the bottom face of the battery mounting unit 111 and is electrically connected to the battery pack 10 when loaded. A positive contact 122, a negative contact 123, and a control contact 124 corresponding to the positive terminal 12a, the negative terminal 12b, and the control terminal 12c, respectively, of the terminal unit 12 are provided in the electrical contact part 121 on the bottom face of the battery mounting unit 111 of the digital still camera 100. Each of the positive contact 122, the negative contact 123, and the control contact 124 is, for example, a conductive plate spring folded into a substantially dogleg shape. The positive terminal 12a of the terminal unit 12 of the battery pack 10 is pressed into contact with the positive contact 122. The negative terminal 12b of the terminal unit 12 of the battery pack 10 is pressed into contact with the negative contact 123. The control terminal 12c of the terminal unit 12 of the battery pack 10 is pressed into contact with the control contact 124. Since the electrical contact part 121 is used when power is supplied from the battery pack 10 to the digital still camera 100, no temperature detection contact is provided for the temperature detection terminal 12d, which is not necessary for discharge. Accordingly, the positive contact 122 is spaced from the negative contact 123 by a distance corresponding to the temperature detection contact that is not provided. A portion surrounded by an alternate long and short dash line in FIG. 10 corresponds to the temperature detection terminal 12d.

The negative contact 123 is spaced from the control contact 124, and a spring 125 for pushing out the battery pack 10 from the battery mounting unit 111 is provided in the space between the negative contact 123 and the control contact 124. The spring 125 is, for example, a coil spring. The spring 125 is contact with the contact portion, which is the space 21a, to urge the battery pack 10 in the direction in which the battery pack 10 is pushed out of the battery mounting unit 111.

Figure 11B:
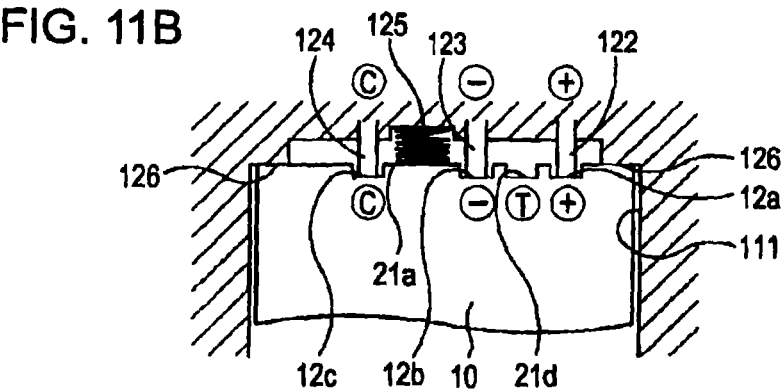
FIG. 11B is a cross sectional view showing a state in which the battery pack according to the embodiment of the present invention is correctly loaded in the battery mounting unit of the digital still camera.

When the battery pack 10 is loaded in the battery mounting unit 111, as shown in FIG. 11B, the positive terminal 12a of the terminal unit 12 of the battery pack 10 is pressed into contact with the positive contact 122, the negative terminal 12b of the terminal unit 12 of the battery pack 10 is pressed into contact with the negative contact 123, and the control terminal 12c of the terminal unit 12 of the battery pack 10 is pressed into contact with the control contact 124. This allows the battery pack 10 to supply power to the digital still camera 100. In addition, a control signal from the digital still camera 100 is supplied to the authentication circuit 32 through the control terminal 12c to enable, for example, the authentication between the battery pack 10 and the digital still camera 100. For example, if the digital still camera 100 authenticates that the mounted battery pack 10 is a normal battery pack 10, the FET device 18c is turned on to start the power supply. The battery pack 10 is inserted into the battery mounting unit 111 until the corners of the front face 11c of the pack body 11, which is headed for the battery mounting unit 111, abut against stopper portions 126. The stopper portions 126 are provided on the corners of the bottom face on which the electrical contact part 121 of the battery mounting unit 111 is provided and are raised from the bottom face. The stopper portions 126 are provided to prevent the electrical contact part 121 from being damaged because of the battery pack 10 that is inserted too deep into the battery mounting unit 111.

The battery pack 10 is in the loaded state when the battery pack 10 is locked with the lock member 112 in the state where the battery pack 10 is loaded in the battery mounting unit 111 and the spring 125 is compressed. The battery pack 10 is pushed out of the battery slot 107 owing to the elastic force of the spring 125 when the battery pack 10 is unlocked from the lock member 112.

Figure 11C:
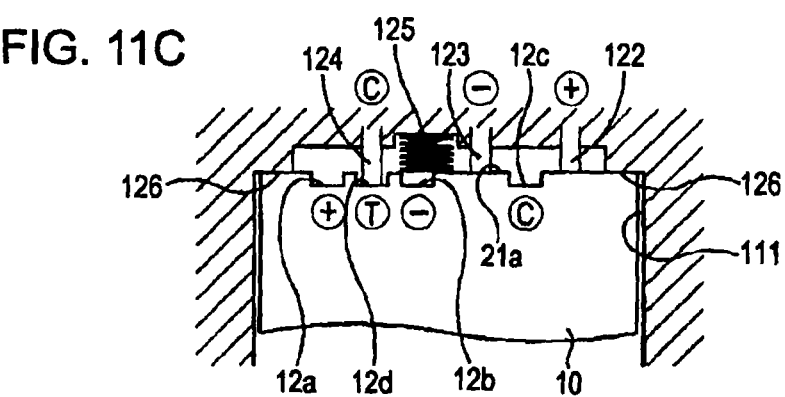
FIG. 11C is a cross sectional view showing a state in which the battery pack according to the embodiment of the present invention is loaded in the battery mounting unit of the digital still camera inside out.

Since the pack body 11 of the battery pack 10 is symmetric with respect to the center line P1 in the width direction and is also symmetric with respect to the center line P2 in the thickness direction and the battery slot 107 and the battery mounting unit ill are provided in accordance with the symmetry of the battery pack 10, the pack body 11 can be inserted into the battery slot 107 inside out without following the indication of the orientation indicator 25a. In such a case, as shown in FIG. 11C, the positive contact 122 and the negative contact 123 in the electrical contact part 121 of the battery mounting unit 111 are contact with portions having no corresponding terminals on one side with respect to the center line P1 in the width direction on the front face 11c of the pack body 11. The control contact 124 is contact with the temperature detection terminal 12d on the other side with respect to the center line P1 in the width direction on the front face 11c of the pack body 11. This is because the control terminal 12c is not arranged symmetrically to the positive terminal 12a and the negative terminal 12b with respect to the center line P1 in the width direction of the pack body 11 and the control terminal 12c is arranged symmetrically to the temperature detection terminal 12d with respect to the center line P1 in the width direction of the pack body 11.

Accordingly, even if the battery pack 10 is inserted into the battery slot 107 inside out, the battery pack 10 is inserted into the battery mounting unit 111 until the corners of the front face 11c of the pack body 11, which is headed for the battery mounting unit 111, abut against the stopper portions 126, which are provided on the corners of the bottom face on which the electrical contact part 121 of the battery mounting unit ill is provided and are raised from the bottom face. Consequently, the stopper portions 126 can prevent the electrical contact part 121, particularly, the positive contact 122 and the negative contact 123 which are not electrically connected to the terminal unit 12 of the battery pack 10, from being folded too much and being damaged because of the battery pack 10 that is inserted too deep into the battery mounting unit 111 even if the battery pack 10 is inserted into the battery slot 107 inside out. Since the positive terminal 12a and the negative terminal 12b of the battery pack 10 do not contact with any contact in the electrical contact part 121 of the battery mounting unit 111, no battery voltage is applied to abnormal contacts. As a result, it is possible to prevent failure of the digital still camera 100 and to prevent the digital still camera 100 from being damaged because of any foreign matter that is contact with the digital still camera 100. Although the temperature detection terminal 12d of the battery pack 10 is contact with the control contact 124 of the battery mounting unit 111, no voltage is applied from the control contact 124 to the temperature detection terminal 12d of the battery pack 10 and no voltage is applied from the temperature detection terminal 12d to the control contact 124 of the digital still camera 100. Accordingly, it is possible to prevent failure of the battery pack 10 and the digital still camera 100 even if the battery pack 10 is loaded in the battery mounting unit 111 inside out.

If the battery pack 10 is inserted into the battery slot 107 inside out, all or part of the spring 125 of the battery mounting unit 111 is overlapped with the negative terminal 12b of the battery pack 10. Even in such a case, since the top end of the spring 125 is larger than the terminal opening 14b for the negative terminal 12b, the spring 125 abuts against the opening end of the terminal opening 14b and is not directly contact with the negative terminal 12b, thus preventing the negative terminal 12b from being damaged. Since no current flows through the spring 125 even if the spring 125 is contact with the negative terminal 12b, it is possible to prevent failure of the battery pack 10 and the digital still camera 100.

The top end of the spring 125 may be smaller than the terminal opening 14b for the negative terminal 12b. Even in this case, since no current flows between the negative terminal 12b and the spring 125, it is possible to prevent failure of the battery pack 10 and the digital still camera 100. The spring 125 may be provided in a portion with which the space 21a, the contact portion, is contact when the battery pack 10 is inserted into the battery slot 107 inside out.

Figure 12:
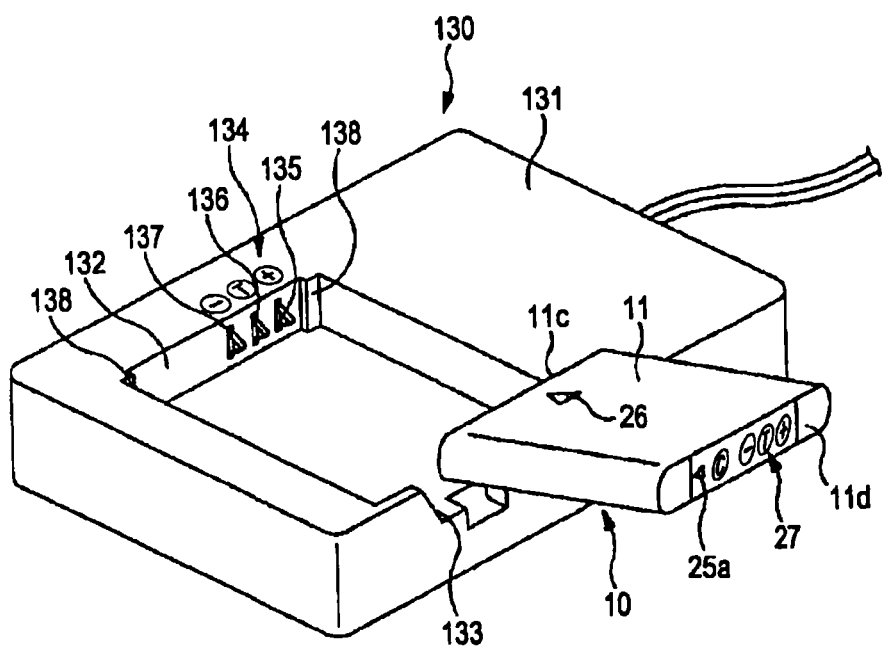
FIG. 12 is a perspective view of a charging device that charges the battery pack according to the embodiment of the present invention.

The battery pack 10 is charged by a charging device separated from the digital still camera 100, as shown in FIG. 12. A charging device 130 in FIG. 12 has a main body 131 provided with a battery mounting unit 132. The battery mounting unit 132 has approximately the same opening space as the areas of the top face 11a and the bottom face 11b of the pack body 11 of the battery pack 10 and has approximately the same depth as the thickness of the pack body 11. A cutout 133 is provided on the battery mounting unit 132 in order to easily mount the battery pack 10 in the battery mounting unit 132 or to easily remove the battery pack 10 from the battery mounting unit 132.

An electrical contact part 134 is provided on the rear face of the battery mounting unit 132. The rear face opposes the terminal unit 12 on the front face 11c of the battery pack 10 to be mounted. A positive contact 135, a temperature detection contact 136, and a negative contact 137 corresponding to the positive terminal 12a, the temperature detection terminal 12d, and the negative terminal 12b, respectively, in the terminal unit 12 of the battery pack 10 are provided in the electrical contact part 134. Each of the positive contact 135, the temperature detection contact 136, and the negative contact 137 is, for example, a conductive plate spring folded into a substantially dogleg shape. The positive terminal 12a of the terminal unit 12 of the battery pack 10 is pressed into contact with the positive contact 135. The temperature detection terminal 12d of the terminal unit 12 of the battery pack 10 is pressed into contact with the temperature detection contact 136. The negative terminal 12b of the terminal unit 12 of the battery pack 10 is pressed into contact with the negative contact 137. Since the electrical contact part 134 is used when the battery pack 10 is charged, no control contact is provided for the control terminal 12c, which is not necessary for the charging, unlike the digital still camera 100. Accordingly, all of the contacts 135, 136, and 137 in the electrical contact part 134 are provided on one side with respect to the center line P1 in the width direction on the front face 11c of the battery pack 10.

When the battery pack 10 is to be loaded in the battery mounting unit 132 of the charging device 130, the user can refer to the function indicating unit 27 on the rear face 11d of the battery pack 10 and the insertion direction indicator 26 on the top face 11a of the battery pack 10 to load the battery pack 10 in the battery mounting unit 132, thus preventing the battery pack 10 from being loaded in the battery mounting unit 132 inside out.

Figure 13A:
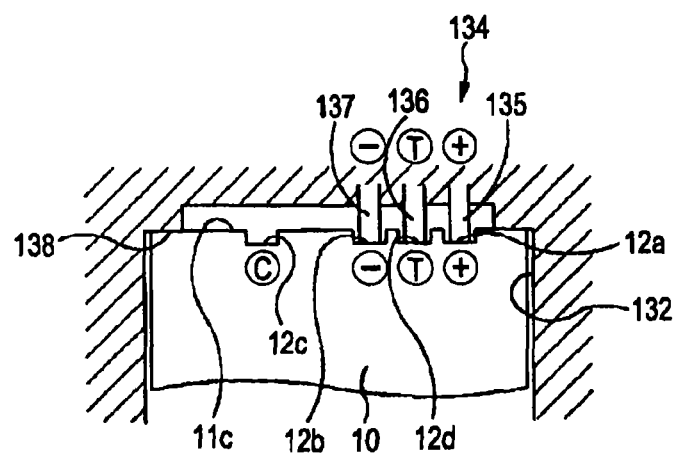
FIG. 13A is a cross sectional view showing a state in which the battery pack according to the embodiment of the present invention is correctly loaded in a battery mounting unit of the charging device and FIG. 13B is a cross sectional view showing a state in which the battery pack according to the embodiment of the present invention is loaded in the battery mounting unit of the charging device inside out.

When the battery pack 10 is loaded in the battery mounting unit 132 of the charging device 130 as shown in FIG. 13A, the positive terminal 12a of the terminal unit 12 of the battery pack 10 is pressed into contact with the positive contact 135, the temperature detection terminal 12d of the terminal unit 12 of the battery pack 10 is pressed into contact with the temperature detection contact 136, and the negative terminal 12b of the terminal unit 12 of the battery pack 10 is pressed into contact with the negative contact 137. Accordingly, the charging device 130 can apply charge voltage to the battery pack 10 to charge the battery pack 10. Since the temperature detection contact 136 of the charging device 130 is contact with the temperature detection terminal 12d of the battery pack 10, the charging device 130 detects the temperature signal supplied from the thermistor 33 to charge the battery pack 10 in response to the temperature signal. The battery pack 10 is inserted into the battery mounting unit 132 until the corners of the front face 11c of the pack body 11, which is headed for the battery mounting unit 132, abut against stopper portions 138. The stopper portions 138 are provided on the corners of the rear face on which the electrical contact part 134 of the battery mounting unit 132 is provided and are raised from the rear face. The stopper portions 138 are provided to prevent the electrical contact part 134 from being damaged because of the battery pack 10 that is inserted too deep into the battery mounting unit 132.

Figure 13B:
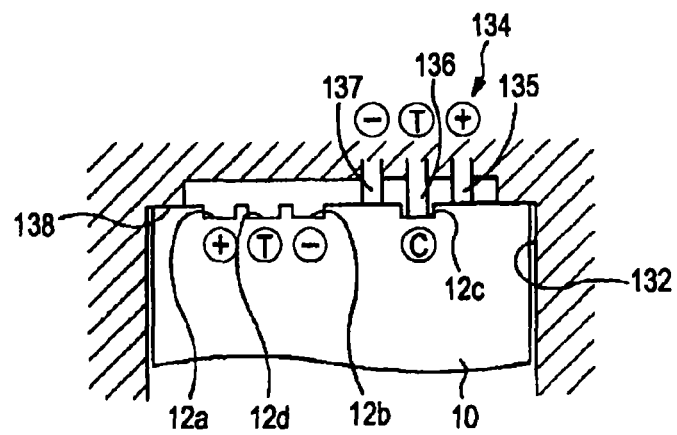

When the battery pack 10 is loaded in the battery mounting unit 132 of the charging device 130 inside out, the battery pack 10 is inserted into the battery mounting unit 132 until the corners of the front face 11c of the pack body 11, which is headed for the battery mounting unit 132, abut against the stopper portions 138, which are provided on the corners of the rear face on which the electrical contact part 134 of the battery mounting unit 132 is provided and are raised from the rear face, as shown in FIG. 13B. Accordingly, the stopper portions 138 can prevent the electrical contact part 134, particularly, the positive contact 135 and the negative contact 137 which are not electrically connected to the terminal unit 12 of the battery pack 10, from being folded too much and being damaged because of the battery pack 10 that is inserted too deep into the battery mounting unit 132 even if the battery pack 10 is loaded in the battery mounting unit 132 inside out. The positive contact 135 and the negative contact 137 in the electrical contact part 134 of the battery mounting unit 132 are contact with portions having no corresponding terminals on the other side with respect to the center line P1 in the width direction on the front face 11c of the pack body 11. The temperature detection contact 136 is contact with the control terminal 12c on the other side with respect to the center line P1 in the width direction on the front face 11c of the pack body 11. This is because the control terminal 12c is not arranged symmetrically to the positive terminal 12a and the negative terminal 12b with respect to the center line P1 in the width direction of the pack body 11 and the control terminal 12c is arranged symmetrically to the temperature detection terminal 12d with respect to the center line P1 in the width direction of the pack body 11.

Since the positive terminal 12a and the negative terminal 12b of the battery pack 10 do not contact with any contact in the electrical contact part 134 of the battery mounting unit 132 of the charging device 130 even if the battery pack 10 is loaded in the battery mounting unit 132 of the charging device 130 inside out, no charge voltage is applied to abnormal contacts. As a result, it is possible to prevent failure of the battery pack 10 and to prevent the battery pack 10 from being damaged because no foreign matter is contact with the battery pack 10. Although the control terminal 12c of the battery pack 10 is contact with the temperature detection contact 136 in the battery mounting unit 132 of the charging device 130, no voltage is applied from the temperature detection contact 136 to the control terminal 12c of the battery pack 10 and, therefore, it is possible to prevent failure of the authentication circuit 32 connected to the control terminal 12c.

Although the battery pack 10 is charged with the dedicated charging device in the above description, the battery pack 10 may be charged with the digital still camera 100. In this case, the digital still camera 100 is provided with a charging circuit and a temperature detection contact is provided between the positive contact 122 and the negative contact 123 in the electrical contact part 121.

Since the pack body 11 of the battery pack 10 configured in the above manner is symmetric with respect to the center line P1 in the width direction and is also symmetric with respect to the center line P2 in the thickness direction, the battery pack 10 can be easily removed from the battery mounting unit 111 even if the battery pack 10 is loaded in the battery mounting unit 111 of the digital still camera 100 inside out. In addition, the orientation indicator 25a is provided on the rear face 11d, which is most visible to the user when the battery pack 10 is inserted into the battery slot 107, and the insertion direction indicator 26 is provided on the top face 11a, which is highly visible, to prevent incorrect insertion.

Since the positive terminal 12a and the negative terminal 12b of the battery pack 10 do not contact with any contact in the electrical contact part 121 of the battery mounting unit 111 as in the example in FIG. 11C even if the battery pack 10 is loaded in the battery mounting unit 111 of the digital still camera 100 inside out, no battery voltage is applied to abnormal contacts. As a result, it is possible to prevent failure of the digital still camera 100 and to prevent the digital still camera 100 from being damaged because of any foreign matter that is contact with the digital still camera 100. Although the temperature detection terminal 12d of the battery pack 10 is contact with the control contact 124 of the battery mounting unit 111, no voltage is applied from the control contact 124 to the temperature detection terminal 12d of the battery pack 10 and no voltage is applied from the temperature detection terminal 12d to the control contact 124 of the digital still camera 100. Accordingly, it is possible to prevent failure of the battery pack 10 and the digital still camera 100 even if the battery pack 10 is loaded in the battery mounting unit 111 inside out.

If the battery pack 10 is loaded in the battery mounting unit 111 of the digital still camera 100 inside out, all or part of the spring 125 of the battery mounting unit 111 is overlapped with the negative terminal 12b of the battery pack 10. Even in such a case, since the top end of the spring 125 is larger than the terminal opening 14b for the negative terminal 12b, the spring 125 abuts against the opening end of the terminal opening 14b, thus preventing the negative terminal 12b from being damaged. Since no current flows through the spring 125 even if the spring 125 is contact with the negative terminal 12b, it is possible to prevent failure of the battery pack 10 and the digital still camera 100.

When the battery pack 10 is to be loaded in the battery mounting unit 132 of the charging device 130, the user can refer to the function indicating unit 27 on the rear face 11d of the battery pack 10 and the insertion direction indicator 26 on the top face 11a of the battery pack 10 to load the battery pack 10 in the battery mounting unit 132, thus preventing the battery pack 10 from being loaded in the battery mounting unit 132 inside out. In addition, as shown in FIG. 13B, since the positive terminal 12a and the negative terminal 12b of the battery pack 10 do not contact with any contact in the electrical contact part 134 of the battery mounting unit 132 of the charging device 130 even if the battery pack 10 is loaded in the battery mounting unit 132 of the charging device 130 inside out, no charge voltage is applied to abnormal contacts. As a result, it is possible to prevent failure of the battery pack 10 and to prevent the battery pack 10 from being damaged because no foreign matter is contact with the battery pack 10. Although the control terminal 12c of the battery pack 10 is contact with the temperature detection contact 136 in the battery mounting unit 132 of the charging device 130, no voltage is applied from the temperature detection contact 136 to the control terminal 12c of the battery pack 10 and, therefore, it is possible to prevent failure of the authentication circuit 32 connected to the control terminal 12c.

In the battery pack 10, the label 24 pasted across the top face 11a, the rear face 11d, and the bottom face 11b of the pack body 11 presses the bottom cover 15 heat-sealed with the tube body 13 toward the tube body 13, as shown in FIGS. 2 to 4, to prevent the bottom cover 15 from dropping from the tube body 13. In addition, pasting the label 24 also on the rear face 11d of the battery pack 10 can improve the flexibility in design of the rear face 11d, to provide, for example, the function indicating unit 27 on the rear face 11d.

The electronic device in which the battery pack 10 according to the embodiment of the present invention is loaded is not restricted to the digital still camera 100 described above. The battery pack 10 according to the embodiment of the present invention may be loaded in a digital video camera, a mobile telephone, or a personal digital assistant (PDA). The battery is not restricted to the lithium ion polymer secondary battery.

It should be understood by those skilled in the art that various modifications, combinations, sub-combinations and alterations may occur depending on design requirements and other factors insofar as they are within the scope of the appended claims or the equivalents thereof.

What is claimed is:

1. A battery pack supplying electricity to an electronic device, the battery pack comprising:
   a pack body that includes a battery cell;
   a terminal unit arranged on a front face of the pack body, the terminal unit including a plurality of terminals; and
   a cover unit arranged on the terminal unit, the cover unit including a plurality of opening parts which each uncover one of the plurality of terminals,
   wherein an external shape of the cover unit is substantially symmetric with respect to a center line of the battery pack, the center line extending in a direction perpendicular to a width direction, the width direction being a direction of arrangement of the plurality of opening parts, viewed from the front face of the pack body, and the cover unit has a circular arc shape on a side face,
   wherein the cover unit includes, in order along the width direction, a first opening part which uncovers a part of a positive terminal, a second opening part which uncovers a part of temperature detection terminal, a third opening part which uncovers a part of a negative terminal, and a fourth opening part, and
   wherein the first opening part and the second opening part are arranged on one side in the width direction of the cover unit with respect to the center line, the fourth opening part being arranged on an opposite side to the one side with respect to the center line, a mirror image of the second opening part on the opposite side with respect to the center line overlaps with the fourth opening part, the first opening part being arranged asymmetrically to the fourth opening part in the width direction of the cover unit with respect to the center line.

2. The battery pack according to claim 1, wherein at least a part of the third opening part is arranged on a same side with the first opening part and the second opening part.

3. The battery pack according to claim 1, wherein a distance between the third opening part and the fourth opening part is different from both a distance between the first opening part and the second opening part, and a distance between the second opening part and the third opening part.

4. The battery pack according to claim 1, wherein the battery pack is insertable into the electronic device from the front face of the battery pack to supply electricity to the electronic device.

5. The battery pack according to claim 1, wherein the cover unit has a substantially flat face.

6. The battery pack according to claim 1, wherein the fourth opening part uncovers a part of a control terminal.

7. A battery pack supplying electricity to an electronic device, the battery pack comprising:
a battery cell
a terminal unit arranged on a front face of the battery cell, the terminal unit including a plurality of terminals; and
a cover unit arranged on the terminal unit, the cover unit including a plurality of opening parts which each uncover one of the plurality of terminals,
wherein an external shape of the battery cell is substantially symmetric with respect to a center line of the cover unit of the battery pack, the center line extending in a direction perpendicular to a width direction, the width direction being a direction of arrangement of the plurality of opening parts, viewed from the front face of the battery cell, and the battery cell has a circular arc shape on a side face, and
wherein the cover unit includes, in order along the width direction, a first opening part which uncovers a part of a positive terminal, a second opening part which uncovers a part of temperature detection terminal, a third opening part which uncovers a part of a negative terminal, and a fourth opening part, and
wherein the first opening part and the second opening part are arranged on one side in the width direction of the cover unit with respect to the center line, the fourth opening part being arranged on an opposite side to the one side with respect to the center line, a mirror image of the second opening part on the opposite side with respect to the center line overlaps with the fourth opening part, and the first opening part being arranged asymmetrically to the fourth opening part in the width direction of the cover unit with respect to the center line.

8. The battery pack according to claim 7, wherein at least a part of the third opening part is arranged on a same side with the first opening part and the second opening part.

9. The battery pack according to claim 7, wherein a distance between the third opening part and the fourth opening part is different from both a distance between the first opening part and the second opening part, and a distance between the second opening part and the third opening part.

10. The battery pack according to claim 7, wherein the battery pack is insertable into the electronic device from the front face of the battery pack to supply electricity to the electronic device.

11. The battery pack according to claim 7, wherein the cover unit has a substantially flat face.

12. The battery pack according to claim 7, wherein the fourth opening part uncovers a part of a control terminal.

13. A battery pack supplying electricity to an electronic device, the battery pack comprising:
a pack body;
a terminal unit arranged on a front face of the pack body, the terminal unit including a plurality of terminals; and
a cover unit arranged on the terminal unit, the cover unit including a plurality of opening parts which each uncover one of the plurality of terminals,
wherein an external shape of the pack body is substantially symmetric with respect to a center line of the battery pack, the center line extending in a direction perpendicular to a width direction, the width direction being a direction of arrangement of the plurality of opening parts, viewed from the front face of the pack body, and
wherein the cover unit includes, in order along the width direction, a first opening part which uncovers a part of a positive terminal, a second opening part which uncovers a part of a terminal and is arranged in a position next to the first opening part, a third opening part which uncovers a part of a negative terminal, and a fourth opening part, and
wherein a mirror image of the second opening part on an opposite side in the width direction of the cover unit with respect to the center line overlaps with the fourth opening part, and the first opening part being arranged asymmetrically to the fourth opening part in the width direction of the cover unit with respect to the center line.

14. The battery pack according to claim 13, wherein at least a part of the third opening part is arranged on a same side with the first opening part and the second opening part.

15. The battery pack according to claim 13, wherein a distance between the third opening part and the fourth opening part is different from both a distance between the first opening part and the second opening part, and a distance between the second opening part and the third opening part.

16. The battery pack according to claim 13, wherein the battery pack is insertable into the electronic device from the front face of the battery pack to supply electricity to the electronic device.

17. The battery pack according to claim 13, wherein the cover unit has a substantially flat face.

18. The battery pack according to claim 13, wherein the fourth opening part uncovers a part of a control terminal.

19. The battery pack according to claim 13, wherein the fourth opening part is arranged on the opposite side of the center line from the first opening part and the second opening part.

* * * * *